United States Patent
Mullally (10) Patent No.: US 11,538,239 B2
(45) Date of Patent: Dec. 27, 2022

(54) JOINT MODELING OF OBJECT POPULATION ESTIMATION USING SENSOR DATA AND DISTRIBUTED DEVICE DATA

(71) Applicant: Orbital Insight, Inc., Palo Alto, CA (US)

(72) Inventor: Fergal Mullally, Palo Alto, CA (US)

(73) Assignee: Orbital Insight, Inc., Palo Alto, CA (US)

( * ) Notice: Subject to any disclaimer, the term of this patent is extended or adjusted under 35 U.S.C. 154(b) by 75 days.

(21) Appl. No.: 17/165,792

(22) Filed: Feb. 2, 2021

(65) Prior Publication Data
US 2021/0200982 A1    Jul. 1, 2021

Related U.S. Application Data

(63) Continuation of application No. 16/410,435, filed on May 13, 2019, now Pat. No. 10,909,366.
(Continued)

(51) Int. Cl.
*G06V 20/13* (2022.01)
*G06F 16/909* (2019.01)
(Continued)

(52) U.S. Cl.
CPC ............ *G06V 20/13* (2022.01); *G06F 16/909* (2019.01); *G06V 10/255* (2022.01); *H04W 4/021* (2013.01);
(Continued)

(58) Field of Classification Search
CPC ...... G06V 10/25; G06V 10/255; G06V 20/13; G06V 20/52; G06V 20/53; G06V 20/54;
(Continued)

(56) References Cited

U.S. PATENT DOCUMENTS

| 8,620,686 B1 | 12/2013 | Reinecke et al. ................. 705/2 |
| 10,796,320 B2 | 10/2020 | Ghosh et al. |

(Continued)

FOREIGN PATENT DOCUMENTS

| CN | 104778836 A | 7/2015 |
| JP | 2015165428 A | 9/2015 |

(Continued)

OTHER PUBLICATIONS

PCT International Search Report and Written Opinion, PCT Application No. PCT/US2020/020507, dated May 20, 2020, 11 pages.
(Continued)

*Primary Examiner* — Andrew W Johns
(74) *Attorney, Agent, or Firm* — Fenwick & West LLP (57) ABSTRACT

A system accesses a plurality of ratio values for similar AOIs, each ratio value indicating a ratio between a count of device users at a similar AOI and a count of vehicles of the similar AOI. The similar AOIs are AOIs that have measurable characteristics within a range of similarity with those of the target AOI. The count of vehicles of the similar AOI is generated using aerial imagery received for the similar AOI. The count of device users at the similar AOI is extracted from third party data for the similar AOI. The system accesses a count of a number of reported device users at the target AOI, and generates an estimate of the vehicle count for the target AOI using the count of the number of reported device users at the target AOI and a combination of the plurality of ratio values for similar AOIs.

20 Claims, 6 Drawing Sheets

Related U.S. Application Data (60) Provisional application No. 62/811,699, filed on Feb. 28, 2019.

(51) Int. Cl.
    *H04W 4/02* (2018.01)
    *H04W 4/021* (2018.01)
    *H04W 36/24* (2009.01)
    *H04W 36/32* (2009.01)
    *H04W 60/04* (2009.01)
    *G06V 10/20* (2022.01)

(52) U.S. Cl.
    CPC ......... *H04W 4/023* (2013.01); *H04W 36/245* (2013.01); *H04W 36/32* (2013.01); *H04W 60/04* (2013.01)

(58) Field of Classification Search
    CPC .......... G06T 2207/30232; G06T 2207/30264; G08G 1/065; G06F 16/909; H04W 4/021; H04W 64/006
    See application file for complete search history.

(56) References Cited

U.S. PATENT DOCUMENTS

| | | | | |
|---|---|---|---|---|
| 10,909,366 | B2* | 2/2021 | Mullally | ............... H04W 4/023 |
| 2004/0117358 | A1 | 6/2004 | Von Kaenel et al. | ............. 707/3 |
| 2008/0248815 | A1 | 10/2008 | Busch | ........................ 455/456.5 |
| 2011/0151839 | A1 | 6/2011 | Bolon et al. | ............... 455/414.1 |
| 2011/0320319 | A1 | 12/2011 | Streich | ......................... 705/27.1 |
| 2013/0176433 | A1 | 7/2013 | Terada et al. | ............ H04N 7/18 |
| 2014/0270355 | A1 | 9/2014 | Terrazas et al. | ..... G06K 9/0063 |
| 2014/0316616 | A1 | 10/2014 | Kugelmass | ............ G05D 1/101 |
| 2015/0230053 | A1 | 8/2015 | Scellato et al. | ....... H04W 4/021 |
| 2016/0366152 | A1 | 12/2016 | Jackson et al. | ....... H04L 63/107 |
| 2017/0250751 | A1 | 8/2017 | Kargieman et al. | . G06K 9/0063 |
| 2017/0293800 | A1 | 10/2017 | Babenko et al. | .. G06K 9/00637 |
| 2017/0311131 | A1 | 10/2017 | South et al. | ............ H04W 4/04 |
| 2018/0053401 | A1 | 2/2018 | Martin et al. | ........ G08B 29/188 |
| 2018/0096595 | A1 | 4/2018 | Janzen et al. | ........ G06K 9/0063 |
| 2018/0293249 | A1 | 10/2018 | Tabares | |
| 2020/0065840 | A1 | 2/2020 | Pinel et al. | ........ G06Q 30/0205 |

FOREIGN PATENT DOCUMENTS

| | | |
|---|---|---|
| JP | 2015207041 A | 11/2015 |
| JP | 2017146771 A | 8/2017 |
| WO | WO 2018/038720 A1 | 3/2018 |

OTHER PUBLICATIONS

PCT International Search Report and Written Opinion, PCT Application No. PCT/US2020/020470, dated Jun. 18, 2020, 16 pages.

United States Office Action, U.S. Appl. No. 16/410,435, dated Oct. 27, 2020, nine pages.

United States Office Action, U.S. Appl. No. 16/803,994, dated Sep. 22, 2021, 19 pages.

Saito, M. et al. "A Proposal of Vehicle Driving vol. Estimation Method Using Spatial Statistics Data." IPSJ SIG Technical Report, 2018 Information Processing Society of Japan, May 17, 2018, vol. 2018-DPS-175, No. 27, pp. 1-12, (with Google Machine Translation).

The Japan Patent Office, Office Action, Japanese Patent Application No. 2021-550206, dated Feb. 15, 2022, six pages.

United States Office Action, U.S. Appl. No. 16/803,994, dated Apr. 12, 2022, 25 pages.

\* cited by examiner

⑤ Receive request for population estimate for target AOI 345

⑥

Provider A Data for
Target AOI on date
350

6 Devices

Provider B Data for
Target AOI on date
355

8 Devices

⑦

Compute estimates
using Provider A ratios
from Similar AOIs 360

6*1.8  = 10.8
6*1.5  = 9
6*1.57 = 9.42

Compute estimates
using Provider B ratios
from Similar AOIs 365

8*1.28 = 10.24
8*1.2  = 9.6
8*1    = 8

⑨

Determine median
value 370

9.51

⑩

Population Estimate
375

9.51 (cars)

JOINT MODELING OF OBJECT POPULATION ESTIMATION USING SENSOR DATA AND DISTRIBUTED DEVICE DATA

CROSS-REFERENCE TO RELATED APPLICATIONS

This application is a continuation of U.S. patent application Ser. No. 16/410,435, filed on May 13, 2019, which claims priority to U.S. Provisional Application No. 62/811,699, filed on Feb. 28, 2019, which are hereby incorporated by reference in their entirety.

TECHNICAL FIELD

This disclosure relates generally to processing of sensor data, and, in particular, to joint modeling of object population estimations using sensor data and distributed device data.

BACKGROUND

The knowledge of the size of a population of objects in a given area of interest (AOI) may prove to be a critical information source in many scenarios. For example, estimating the number of people at a given time of day that may be present in a building may assist in disaster planning and evacuation. Estimating an amount of foot traffic in a commercial space may also assist in transportation planning and future commercial development.

Multiple methods may be used to determine a population size at a target AOI. A simple approach may simply be to visit a location and count each of the objects of interest at the location. However, this quickly poses a logistical issue when more than a few estimates are needed, and when the size of the AOI, and the number of objects is large. Instead, sensor data of the AOI, such as aerial imaging, may be used to estimate a population. This sensor data can be used to gather information used to estimate the population at the target AOI without an on-location component.

However, this sensor data may be gathered only sporadically and/or infrequently for a target AOI, and therefore population estimates may only be generated when the sensor data is gathered. For example, an aerial imaging device (e.g., an orbital imaging satellite, airplane with attached imaging device) may not pass over a target AOI or otherwise may not collect imagery with sufficient frequency to properly monitor the AOI frequently. Thus, population estimates of each target AOI may only be possible during points in time in which sensor data is available. Therefore, what is lacking is a method of using infrequently gathered sensor data from devices such as aerial imaging devices to estimate population information for a target AOI for any point in time.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

Figure (FIG. 1 illustrates an example system for joint modeling of object population estimation using sensor data and distributed device data, in accordance with an embodiment.

DETAILED DESCRIPTION

The Figures (FIGs.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed by way of example embodiments are systems, methods and/or computer program products (e.g., a non-transitory computer readable storage media that stores instructions executable by one or more processing units) for a system for joint modeling of object population estimation using sensor data and distributed device data.

In one example embodiment, the system includes an aerial imaging storage subsystem to store images captured by an aerial imaging device. The system further includes a population estimation system to receive a request to estimate a vehicle count for a target area of interest (AOI). The population estimation system accesses a plurality of ratio values for similar AOIs, with each ratio value indicating a ratio between a count of a number of reported device users at a similar AOI and a count of a number of vehicles of the similar AOI. Each similar AOI is an AOI that has measurable characteristics that are within a range of similarity with corresponding measurable characteristics of the target AOI. The count of the number of vehicles of the similar AOI is generated using aerial imagery received from the aerial imaging storage subsystem for the similar AOI. The count of the number of reported device users at the similar AOI is extracted from third party data that indicates a geographical location of one or more mobile devices at one or more points in time. The population estimation system further accesses a count of a number of reported device users at the target AOI, and generates the estimate of the vehicle count for the target AOI using the count of the number of reported device users at the target AOI and a combination of the plurality of ratio values for similar AOIs.

Example System Environment

Figure 1:
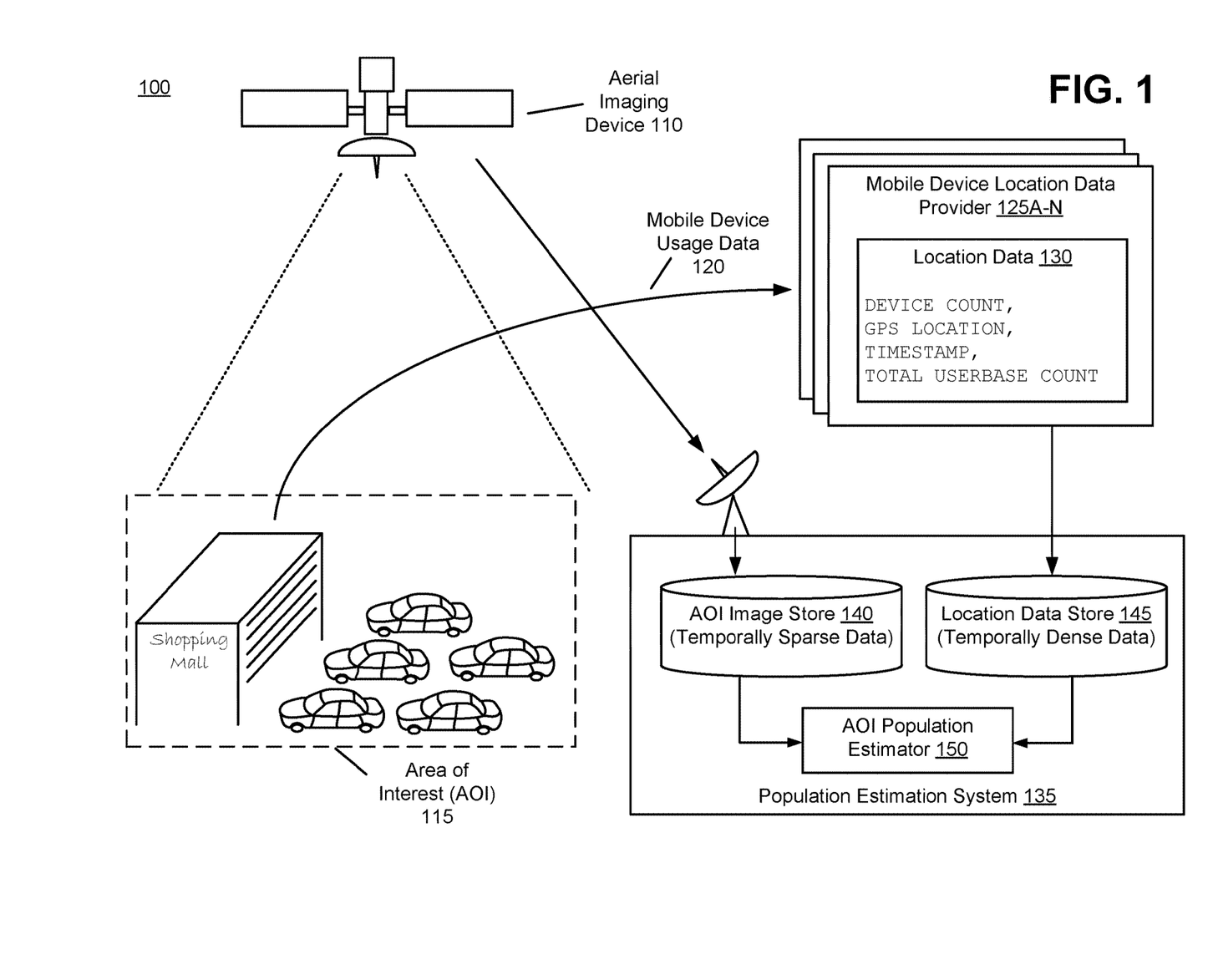

Figure (FIG. 1 illustrates an example system for joint modeling of object population estimation using sensor data and distributed device data, in accordance with an embodiment. The example system environment shown in FIG. 1 may include an aerial imaging device 110 to capture sensor data of an area of interest (AOI) 115, mobile device usage data 120 transmitted by mobile devices to one or more mobile device location data providers 125, which provide location data 130 to the population estimation system 135, which estimates a population of the AOI 115 at a selected target time based on the aerial imaging from the aerial imaging device 110 and the location data 130.

The aerial imaging device 110 is a device that captures imaging data, such as photos, regarding the AOI 115. In one embodiment, the aerial imaging device 110 is a satellite, drone, helicopter, airplane, or other device capable of positioning itself at an elevation that is higher than the AOI 115. The aerial imaging device 110 further includes an imaging system, with one or more imaging sensors capable of capturing images of the AOI 115. If the aerial imaging device 110 has multiple imaging sensors, each may capture electromagnetic (EM) radiation in a different range of wavelengths (e.g., green, blue, red, infrared, or millimeter wavelengths).

The aerial imaging device 110 transmits captured images of an AOI 115 to the population estimation system 135. The aerial imaging device 110 may also transmit metadata along with each set of sensor data describing the captured images. This metadata may include the time of capture of the sensor data, the geographic location (e.g., identified by geographic coordinates) of the captured images, including the geographic boundaries corresponding to the borders of the captured images, range of wavelengths captured, shutter speed, aperture size, focal length, field of view, etc. The captured images and associated metadata may be transmitted to an intermediary, such as a satellite imagery provider, before being transmitted to the population estimation system 135.

While the aerial imaging device 110 is referred to herein as an aerial imaging device, it may capture any type of sensor data regarding the AOI 115, and is not limited to sensor data in the visible spectrum. The sensor data may include any electromagnetic, sound, vibration, chemical, particle, or other data regarding any characteristics or environment of the AOI 115 that may be captured using a computing device, machine, or other electro-mechanical component, such as a accelerometer, camera, microphone, moisture sensor, etc. Furthermore, the aerial imaging device 110, although shown to be located at a position higher in elevation relative to the AOI 115, in other embodiments the aerial imaging device 110 may gather the sensor data for the AOI at different elevations or positions relative to the AOI 115, such as below the AOI 115 in elevation, at the same elevation as the AOI 115, and so on. For example, the aerial imaging device 110 may be a surface-based scanner, such as a LIDAR, radar imaging, or other scanning device, such as a sensor/imaging device located on a mobile platform such as a car that captures data regarding an AOI while driving by or through the AOI.

The area of interest (AOI) 115 is an area on a land surface (e.g., the surface of the Earth), and all features (natural and man-made) within that area. The AOI 115 may be defined by a closed boundary on the land surface. The closed boundary itself may be defined using various connected geographic markers, which may be indicated using geographic coordinates, such as longitude and latitude indicators. Alternatively, the AOI 115 may be defined by a set of vectors describing the closed boundary. In some cases, the AOI 115 may be defined using multiple closed boundaries, with each closed boundary defined using one of the methods noted above. The AOI 115 may also have within one of its closed boundaries an excluded area or areas. These excluded areas may also be defined using closed boundaries and are specified in a similar fashion. In another embodiment, the AOI 115 is defined using a cartographical indicator, i.e., a commonly, conventionally, administratively, or legally agreed upon indicator of a bounded area on a land surface. For example, these cartographic indicators may include a point of interest, landmark, address, postal code, city/town/village, metropolitan area, country, province/county, neighborhood, unincorporated area, and so on. For example, the AOI 115 may be indicated using a postal code, which is defined by a postal service of a country.

The AOI 115 represents a geographic location for which information, such as a population estimate of objects within the AOI 115, is of interest to a requesting party. For example, a municipal government may be interested in an amount of foot traffic at a public transit station over time to determine how to plan for future public transportation infrastructure developments. Other examples of AOIs 115 may include shopping malls, airports, neighborhoods, schools, and so on. The AOI 115 may further be bounded by an upper elevation and/or lower elevation limit.

In one embodiment, the AOI 115 is not a location on the land surface, but a closed three-dimensional space at any location. It may be defined using a plurality of three dimensional coordinates which are connected together using planar surfaces, or may be described in terms of geometric shapes.

The mobile device usage data 120 includes data received from mobile devices, which includes any device that may be able to gather location information of the device and transmit it via a network (e.g., a mobile or cellular network) to an external system, such as the mobile device GPS providers 125. Examples of mobile devices include smartphones, tablets, smart watches, navigation units on vehicles, GPS trackers, laptops, etc. The location information may be gathered using a component of the mobile device capable of receiving information from GPS or similar satellite navigation system (e.g., GLONASS, Galileo, Beidou), or may be gathered using other methods of approximating location, such as via detection of nearby Wi-Fi networks or cellular network towers. A mobile device may be associated with a user (or more than one user). It may be a device carried or worn by the user. In this respect it may serve as a proxy for the user and provide information about the user, and in particular the location information of that user. Therefore, by receiving mobile device usage data that includes location information, the current location of an associated user may also be inferred. In one embodiment, a mobile device may also be referred to as a device.

The mobile device usage data 120 may include, but is not limited to, the current geographic location of the mobile device and the current time. The geographic location may be indicated using geographic coordinates, e.g., latitude, longitude, and/or altitude data, nearby Wi-Fi network names, nearby cellular tower locations, or other methods, such as those used to define the AOI 115 as described above. For example, the geographic location may be indicated as a point of interest at which the mobile device is located. The current time may be indicated a varying levels of accuracy, e.g., millisecond, second, minute, or day level of accuracy. For example, the current time may be indicated in a 64-bit integer using the Unix time format.

The mobile device usage data 120 may include other information, such as an identifier of the user account that is logged into the mobile device, a mobile application which generated the mobile device usage data 120, historical geographic location information, and so on.

The mobile device location data providers 125 receive the mobile device usage data 120 and transmit the location data 130 to the population estimation system 135 based on the mobile device usage data 120 (upon request or periodically). As used herein, the term mobile device location data provider may be used in the plural or singular to refer to more than one or one mobile device location data provider. Each mobile device location data provider 125A-N may be associated with mobile device usage data 120 from a specific application, mobile device manufacturer, mobile device operating system, or other entity which gathers the mobile device usage data 120 from a subset of all mobile devices. For example, a first set of mobile devices has installed thereupon an application A, which transmits mobile device usage data 120 to a mobile device location data provider 125A, while a second set of mobile devices (which may overlap with the first set) has installed thereupon an application B, which transmits mobile device usage data 120 to a separate mobile device location data provider 125B. The application on the mobile device may transmit the mobile device usage data 120 by accessing one or more application programming interfaces (APIs) of an operating system of the mobile device in order to access a data transmission mode that allows the application to transmit the mobile device usage data 120 across a network, e.g., via cellular data transmission, Wi-Fi data transmission, Bluetooth data transmission, or any other network transmission technology, to a mobile location data provider 125, and more specifically, to one or more network servers of the mobile location data provider 125. The mobile device usage data 120 can include the location data of the mobile device, which the application may access by using an API of the operating system of the mobile device as well. While the provider of the application and the mobile device location data provider 125 may be the same entity, in some cases these entities are separate, with the application provider sending the location data of the mobile devices to the mobile device location data provider 125 for collection and subsequent transmission to the population estimation system 135.

After processing the mobile device usage data 120, the mobile device location data providers 125 transmits the location data 130 to the population estimation system 135. In one embodiment, the location data 130 includes, for each geographic location, a device count (or unit count) indicating the number of mobile devices transmitting mobile device usage data 120 that reports the mobile device being at that geographic location, an indication of the geographic location itself (which may be identified using geographic coordinates, or any of the methods described above for identifying geographic locations), a timestamp at which the data was captured, and/or a total userbase count. The device count may be determined by counting a number of unique device, application, or other signatures reported in the mobile device usage data 120 from the mobile devices. The total userbase count indicates the total number of (unique) mobile devices who are registered with the particular mobile device location data provider 125 and which can send mobile device usage data 120 to the mobile device location data provider 125. For example, for a particular application A, 100 mobile devices may have application A installed thereupon and are at a particular geographic location, however, a total of 1 million mobile devices exist which have application A installed thereupon. Therefore, the total userbase count for application A would be a million, whereas the device count at the geographic location would be 100.

In contrast to the frequency of the data provided by the aerial imaging device 110, the location data 130 may be transmitted with much higher frequency to the population estimation system 135. This is because the aerial imaging device 110 may not make frequent (e.g., daily, weekly) captures of sensor data (e.g., images) of the AOI 115. For example, if the aerial imaging device 110 is a satellite, it has a fixed orbit which results in a fixed capture pattern of land areas on the planet, and thus it may not pass frequently over the AOI 115 to capture an image. However, the mobile device usage data 120 used to generate the location data 130 is gathered from users of mobile devices, and these mobile devices are used frequently by these users in a current AOI and accompany them to many AOIs 115. Furthermore, there are a much higher number of mobile device users compared to aerial imaging devices 110.

While the location data 130 may be used to estimate a population at an AOI 115, it is however much less accurate compared to the data captured by the aerial imaging device 110 because of many factors inherent in the data. For example, not all users at an AOI 115 may have a mobile device, and not all users may have installed, signed up for, or enabled a service that transmits the mobile device usage data 120 to a mobile device location data provider 125. Furthermore, the mobile device usage data 120 is fragmented amongst multiple mobile device location data providers 125, and it may not be feasible to receive location data 130 from all of these providers.

Thus, the location data 130 received by the population estimation system 135 may include data, such as location information of mobile devices, which can be sampled at many points in time, but it is inaccurate. The data from the aerial imaging device 110, such as the sensor data or captured images from the aerial imaging device 110, is accurate, but it is temporally sparse. Therefore, by themselves, neither the data from the aerial imaging device 110 nor the location data 130 may be used to accurately estimate a population of objects at an AOI 115 at any arbitrarily selected point in time. Each may not be an accurate estimate of the total number of cars at the AOI because of the fraction of devices to cars is not well measured at that location. However, as described below, a novel transformation and modeling of this data by the population estimation system 135 allows the population estimation system 135 to accurately estimate a population at an AOI 115 for any point in time.

The population estimation system 135 estimates a population of objects at an AOI 115 using the imaging data or other sensor data received from the aerial imaging device 110 and the location data 130 received from the mobile device location data providers 125. In one embodiment, the population estimation system 135 includes an AOI image store 140 and a location data store 145, and an AOI population estimator 150.

The AOI image store 140 stores the images (or other sensor data) received from the aerial imaging device 110 (or an intermediary) for multiple AOIs 115. As noted previously, this data is temporally sparse, but (typically) accurate, as it can capture an entirety of an AOI 115. The AOI image store 140 may be a database, with each entry in the database having a column indicating a metadata item associated with a received image, such as timestamp of capture, spectral band of the light captured, sequence number, incidence angle of the aerial imaging device, speed and orientation of the aerial imaging device, model number of sensor on the aerial imaging device used to capture the image, aperture information, shutter speed information, identifier of aerial imaging device 110 which captured the image, geographic location of the image, geographic coordinate boundaries of the image, cloud coverage amount in the image, intensity of light captured on an absolute scale (i.e., irradiance), image resolution, image color depth, and the image itself or a link or reference to the image stored in a binary format at an image store. The geographic location of the image may be a geographic coordinate (e.g., longitude and latitude), AOI name, satellite position, or any other method of identifying a geographic location as described above for the mobile device usage data 120 or the AOI 115.

The location data store 145 stores the location data 130 received from the one or more mobile device location data providers 125. In one embodiment, the location data store 145 is a database, with each entry in the database storing the individual data elements of the location data 130 (e.g., device count, location information, etc.) described above.

The AOI population estimator 150 estimates a population of a target AOI at a target time (e.g., a minute, hour, date, week, month) using a joint model that receives as input the image data from the AOI image store 140 and the location data from the location data store 145. The target AOI and the target time may be requested by an external entity, and may be fed as input to the AOI population estimator 150.

Initially, the AOI population estimator 150 may identify AOIs which are similar to the target AOI. These are AOIs that share measurable characteristics (e.g., size, demographics, location) which are within a range of similarity (e.g., within 10%) to the target AOI. For example, if the target AOI is a shopping mall, similar AOIs may be other shopping malls which are of a similar size, within cities of similar demographics and population size, and so on.

For each of these images of a similar AOI, the AOI population estimator 150 generates a count of the number of unique objects in the captured images for that AOI. In one embodiment, these objects may be cars. However, in other embodiments, these objects may be other non-stationary objects, such as people, bicycles, animals, shopping carts, inventory items (e.g., items placed for sale), and so on. The AOI population estimator 150 may estimate the number of objects within the captured image using a computer vision or other computer object recognition system.

In addition, the AOI population estimator 150 identifies location data entries in the location data store 145 that has a timestamp matching (or within a range) of the capture timestamp of the captured image of the similar AOI, and which indicates a geographic location matching (or within a radius) of the geographic location of the similar AOI. The AOI population estimator 150 may identify multiple sets of location data matching this criteria, as the location data store 145 may store location data 130 from multiple mobile device location data providers 125. The AOI population estimator 150 extracts the device count for each set of location data corresponding to each of the similar AOIs. Each of these device counts indicates a number of reported devices, reported by each mobile device location data provider 125, which are reported to be at a similar AOI at a timestamp that matches or is within a range of the capture time of the captured image of the similar AOI.

For each similar AOI, the AOI population estimator 150 determines one or more ratio values. Each ratio value is a ratio between 1) a count of the number of unique objects at the similar AOI determined based on captured images of the similar AOI, and 2) a count of a number of reported devices reported at (or within a range of) the timestamp of the captured images, for a geographic location matching that of the similar AOI, and received from one of the mobile device location data providers 125 (e.g., received per application). For example, the AOI population estimator 150 may have determined that a captured image of a similar AOI has 10 vehicles within the image. These may be vehicles parked at the AOI. The AOI population estimator 150 further identifies location data indicating 5 mobile devices at that location at a timestamp near to the timestamp of the captured image. Thus, the ratio between the car count and the device count is 2.0. Therefore, each similar AOI may have multiple ratio values, each ratio value associated with a particular mobile device location data provider 125 and a period of time at which the captured images and location data was generated.

The above process of generating the ratio values may be performed prior to receiving the target time and target AOI request. The ratio values as described above may be generated, and periodically updated as new captured images are received, for a list of AOIs, or for AOIs which have previously received requests for population estimates. These ratio values may be associated with each AOI.

When the AOI population estimator 150 receives the population estimate request by a user or some other process for establishing the request for a target AOI for a target time, the AOI population estimator 150 retrieves location data for the target AOI from the location data store 145, or requests this information directly from the one or more mobile device location data providers 125. As noted, each set of location data indicates a number of devices reported by a mobile device location data provider 125 for a location, such as the target AOI. The AOI population estimator 150 may retrieve location data that have timestamps that are within a range of the target time. For each set of location data within this range, the population estimation system 135 modifies the number of reported users indicated for the target AOI by the ratios generated above for similar AOIs and generated using data from the same respective provider, and at or near the same timestamp. For example, location data captured on a particular day from a mobile device location provider 125A is multiplied by the ratios for similar AOIs generated using data received from the same mobile device location provider 125A and captured on the same day.

The population estimation system 135 uses this method to generate multiple estimates. These are then combined into a single combined estimate using a combination function. This combination function may be to select the median among the multiple estimates as the combined estimate. The population estimation system 135 may report this combined estimate to the requestor of the estimate, along with metadata such as the similar AOIs that were identified, the individual estimates, the raw location data, the combining function used, and so on.

Additional details regarding the population estimation system 135 are described below with reference to FIGS. 2-4.

Using the above system, a more accurate population estimate may be generated by jointly modeling the population estimate using both sensor data, such as imaging data, from an aerial imaging device, and location data reported from mobile devices. Individually, the data from the aerial imaging device and the location data from the mobile devices cannot accurately predict the population of objects such as cars, or persons, at an AOI for any arbitrary point in time. The data (e.g., the images) from the aerial imaging device is captured infrequently, and thus cannot capture information for multiple times as is necessary for time specific population determination. The location data, while frequent, is inaccurate as it cannot encompass all mobile device users and cannot encompass those users without mobile devices, and may be skewed to particular demographics or have other biases. However, by analyzing similar AOIs, modifying these two datasets, and generating a completely new result as the estimate as described above, an accurate estimate of a population at a target AOI can be generated using these two sets of originally inaccurate or inadequate data.

Example Block Flow for the Population Estimation System

Figure 2:
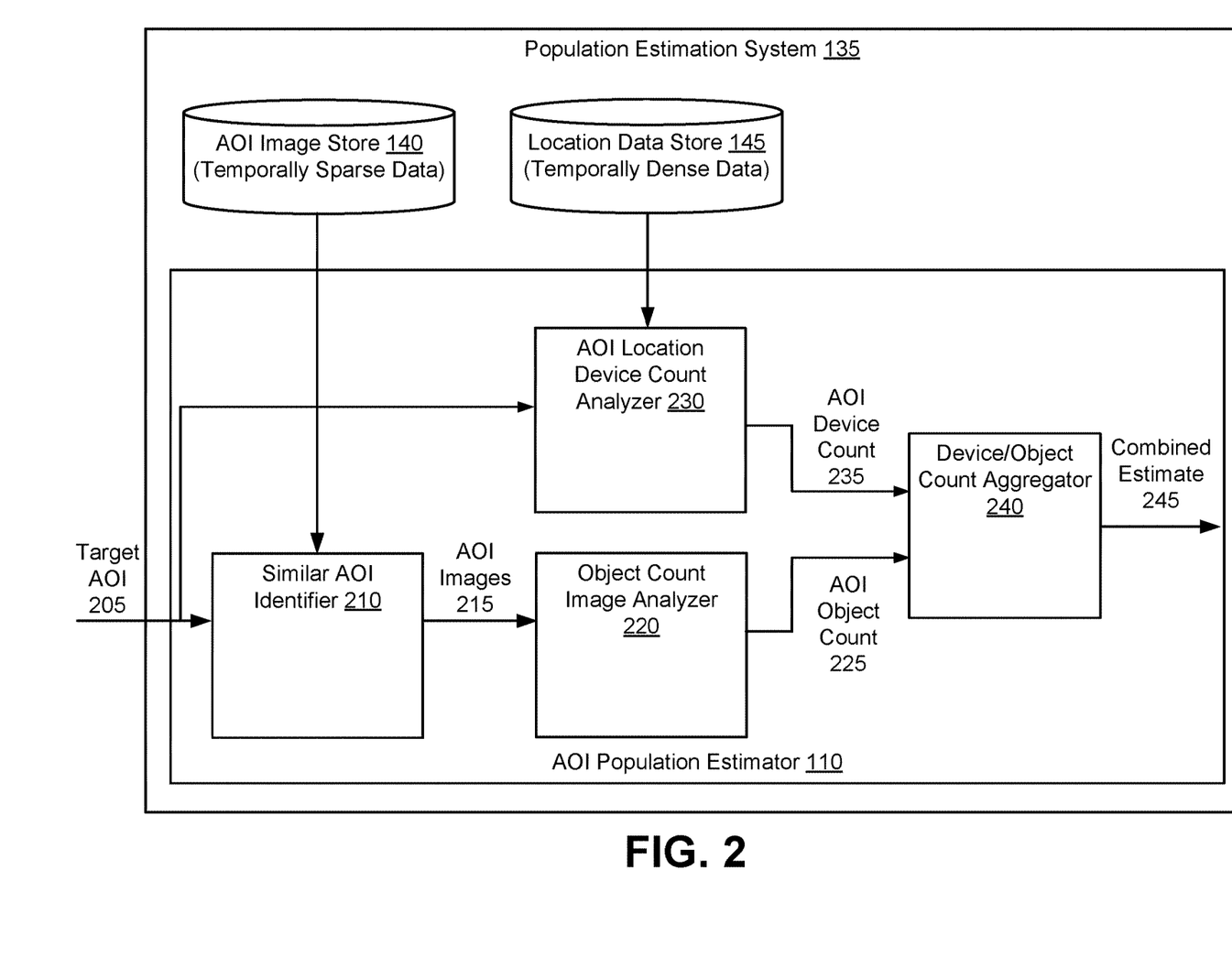
FIG. 2 is a block diagram illustrating an example flow for the joint modeling of object population estimation using sensor data and distributed device data, in accordance with an embodiment.

FIG. 2 is a block diagram illustrating an example flow for the joint modeling of object population estimation using sensor data and distributed device data, in accordance with an embodiment. FIG. 2 illustrates the process for generating the population estimation in detail for the population estimation system 135 of FIG. 1. As shown, the population estimation system 135 includes the AOI image store 140, the location data store 145, and the AOI population estimator 110. The AOI population estimator 110 further includes a similar AOI identifier 210, a vehicle count image analyzer 220, an AOI location device count analyzer 230, and the device/vehicle count aggregator, in order to generate the accurate population estimate 245.

The similar AOI identifier 210 identifies AOIs similar to a target AOI 205. The target AOI 205 may be an AOI which the system is currently analyzing, or may be an AOI for which a population estimate is requested. In one embodiment, the similar AOI identifier 210 finds similar AOIs by finding AOIs in a database of AOIs that have characteristics matching, or within a certain range of (e.g., 90%), those of the target AOI. This database of AOIs may be received from a third party and include a list of AOIs along with their characteristics. If an AOI has a threshold number (e.g., 90%) of characteristics matching that of the target AOI, that AOI may be considered a similar AOI to the target AOI. These characteristics may include, but are not limited to the existence of covered parking, amount of covered parking, size of parking area/number of parking spots, geographic area, postal code, size (e.g., square footage of building), land area size, grade (e.g., profitability or other grading system), foot traffic count, vehicle traffic count, traffic patterns, time zone, types of public transportation available at the location, number of public transportation options, capacity of public transportation at AOI, amount of revenue generated at the AOI, type of the AOI, category of the AOI (e.g., educational, commercial, etc.), owner of the AOI, whether the AOI is publicly or privately owned, demographics of patrons (e.g., workers, customers, attendees), existence of some other conditions, and amount of the other conditions, etc.

In one embodiment, the similar AOI identifier 210 avoids selecting AOIs that have some negative characteristics. These may include those characteristics that may cause captured data regarding the AOI to be inaccurate. These may include AOIs that have covered parking (which prevent the accurate counting of vehicles), nearby locations (e.g., within location data margin of error, such as 5 m) with a significant amount of mobile device traffic (e.g., an average of more than 10 mobile devices within a square meter) that might affect the location data reported for the AOI (e.g., freeways, roads, pathways, other AOIs), or AOIs with known inaccurate location data provided by the mobile device location data providers 125.

In one embodiment, the similar AOI identifier 210 identifies similar AOIs using a machine model, such as a neural network, regression model, or PCA (principal component analysis). This model is trained using features that include images of the AOI and one or more of the characteristics described above, as well as a ground truth indicating whether the AOI is similar to a target AOI. By training the model on pairs of AOIs (a target AOI and the candidate AOI), the model may be trained to determine whether an AOI is similar to a target AOI, after receiving as features the images of the AOIs and one or more of the characteristics of the AOIs, as described above.

Upon identifying the similar AOIs, the similar AOI identifier 210 sends images 215 of the identified similar AOIs from the AOI image store 140 to the object count image analyzer 220. The similar AOI identifier 210 may send images to the object count image analyzer 220 when they are received at the AOI image store 140 (i.e., when they are received from the aerial imaging device 110 or when they are received from a third party provider). Alternatively, the similar AOI identifier 210 may send the images on-demand upon receipt of a request to estimate a population for a target AOI. For each AOI, the similar AOI identifier 210 may send images from multiple capture events. A capture event is a period of time or an event in which images of the entire AOI are captured. For example, a single image capture event may refer to the aerial imaging device 110 making a single pass over the similar AOI and taking one or more photos of the similar AOI during that single pass. The similar AOI identifier 210 also transmits metadata regarding the images 215, such as an identifier indicating which image 215 belongs to which AOI, when the images were captured, which capture event each image belongs to, etc. The similar AOI identifier 210 may also store which AOIs are similar to target AOIs in a database, such as the AOI image store 140. For example, the AOI image store 140 may indicate, for each AOI, which other AOIs are similar to that AOI. This similarity may be updated periodically as the similar AOI identifier 210 analyzes new images from AOIs or receives new information regarding AOIs. In one embodiment, the similar AOI identifier 210 only transmits images captured of the similar AOIs which are within a specific lookback range of a target time (i.e., a point in time at the AOI at which the population estimate is to be computed). This lookback range may be seven days (i.e., a week), and may be determined based on a balance between 1) obtaining sufficient imagery of similar AOIs and 2) having a sufficiently fast response time to changes in the ratio values.

The object count image analyzer 220 receives the AOI images 215 of the similar AOIs to the target AOI from the similar AOI identifier 210, and also receives images of the target AOI 205, in order to count a number of objects indicated in the images. These objects may include vehicles, persons, and so on, as described above. In the case where the AOI images 215 are images, the object count image analyzer 220 uses a computer vision system (e.g., OpenCV) to analyze the images to determine a count of the number of objects in the images. For each AOI, and for each set of images in a single capture event, the computer vision system utilized by the object count image analyzer 220 counts the number of specified objects in the images. For example, a set of images may have captured 50 vehicles. The object count image analyzer 220 analyzes these images and determines that the images indicate 50 vehicles for a particular capture event. The object count image analyzer 220 may generate this information for multiple AOIs for multiple capture events prior to the population estimation system 135 receiving a request to generate a population estimate for the target AOI 205, and may store the generated object count for each AOI in the AOI image store 140. Each object count generated by the object count image analyzer 220 may be stored with a particular capture event for an AOI.

In some cases, the data received from the similar AOI identifier 210 may not be the AOI images 215, but may be other sensor data, as described above. In these cases, the object count image analyzer 220 may use another form of data analysis to determine the number of objects in the sensor data. For example, if the data includes LIDAR data, the object count image analyzer 220 may convert the LIDAR data into a 3D point cloud and use a 3D object recognition system to determine how many objects of interest are countable in the sensor data.

After determining the number of objects for a capture event for a similar AOI, the object count image analyzer 220 may transmit the object count 225 for that capture event and that similar AOI to the device/object count aggregator 240. In one embodiment, the object count image analyzer 220 transmits only the object counts for similar AOIs for capture events that have a timestamp within the lookback range of the target time.

The AOI location device count analyzer 230 receives the location data from the location data store 145 and generates device counts for the similar AOIs using the location data. In one embodiment, the geographic location in the location data is indicated using latitude and longitude values. In this case, the AOI location device count analyzer 230 determines if this location is within a geographic boundary of any AOI. These geographic boundaries may be stored in the AOI image store 140 for each AOI, or may be stored in a separate database. If the location data is within the geographic boundary of an AOI, the AOI location device count analyzer 230 modifies the location data to indicate that it is location data for the AOI. Multiple sets of location data from the same mobile device location data provider 125 captured within a short timeframe (e.g., 10 seconds) may have different geographical locations indicated but be within the same AOI. In this case the AOI location device count analyzer 230 may join these sets of location data together into a single set of location data for the AOI, setting a timestamp for that single set to be an average timestamp of the individual sets of location data used to create the single set. The AOI location device count analyzer 230 may also remove duplicate devices from the single set of location data, if information necessary to remove duplicates (e.g., device IDs) is available in the location data.

For each AOI, the AOI location device count analyzer 230 identifies sets of location data for that AOI in the location data store 145 that have a timestamp matching, or within a range of a timestamp of a capture event of AOI images stored in the AOI image store 140 (e.g., ±1 hour or ±1 day). For example, if the AOI image store 140 includes images captured at noon, the AOI location device count analyzer 230 determines if location data exists for that AOI that has a timestamp between 11 am to 1 pm (assuming a ±1 hour window). This may result in identifying multiple sets of location data from a single mobile device location data provider 125. If this occurs, the AOI location device count analyzer 230 may identify the location data with a timestamp nearest to the timestamp of the capture event. Alternatively, the AOI location device count analyzer 230 may utilize all location data with a timestamp within the time range, and removes any duplicates within the multiple sets of location data which report the same mobile device more than once. After parsing through the location data using this process, the AOI location device count analyzer 230 may identify multiple sets of location data, with each set of location data sourced from a different mobile device location data provider 125.

For each set of location data, the AOI location device count analyzer 230 determines a count of the number of devices reported in the location data. As noted above, the location data indicates location information for mobile devices. These devices have some capability to report a geographic location, and they have installed or are subscribed to a service that can collect this information and transmit it to the population estimation system 135. The information that is transmitted to the population estimation system 135 may include details for each mobile device over time, or may aggregate this information into device counts indicating a number of mobile devices near a geographic location. The AOI location device count analyzer 230 can thus count how many individual devices have reported that they are located at an AOI. Thus, the AOI location device count analyzer 230 can determine this device count for each AOI near to the timestamp of each capture event for an AOI. This device count 235 is transmitted to the device/object count aggregator 240. In one embodiment, the AOI location device count analyzer 230 only transmits device counts 235 for the similar AOIs that are associated with capture events within a lookback range of the target time. The AOI location device count analyzer 230 may compute the device counts for the similar AOIs before receiving a request for the target AOI 205.

The AOI location device count analyzer 230 may also analyze a device count for the target AOI for a time nearest to the target time, and send this analysis to the device/object count aggregator 240 as well.

To remove inaccurate data, the AOI location device count analyzer 230 may remove duplicates, as noted above. Furthermore, the AOI location device count analyzer 230 may remove counts of devices which indicate a high movement speed (e.g., beyond that of an average human running speed, such as 6 miles per hour). The movement speed may be determined if the AOI location device count analyzer 230 has access to location data that contains high frequency updates and location information regarding individual devices. The AOI location device count analyzer 230 can compute a speed of a device by determining the distance travelled by the mobile device between two updates of location information. A high movement speed may indicate that the device is within a fast-moving conveyance, such as a vehicle, public transportation, and so on, and does not accurately represent a device residing at the AOI. Rather, it represents a transient signal and should be ignored. The AOI location device count analyzer 230 may also remove counts of devices due to other factors, such as counts from devices which have a large positional uncertainty, devices which show a lack of movement (e.g., a certain movement beyond a minimum distance within a certain time period), devices that only appear sporadically (e.g., below a certain frequency per time period) within all the location data information from a provider, or devices which have been assigned a default location by the provider because a location was not ascertained for that device by the provider.

The AOI location device count analyzer 230 may also filter out other location data in order to improve accuracy based on the total counts of devices reported by a provider for an AOI. The AOI location device count analyzer 230 may remove location data that has a device count that is below a certain count (e.g., 10 devices) for the AOI. A low device count may indicate inaccurate data as not many mobile device users may be using the service that provides the location data to the mobile device location data provider 125. Furthermore, similar to the object count image analyzer 220, the AOI location device count analyzer 230 may also only provide device counts for similar AOIs that are associated with capture events within a lookback range of the target time. The AOI location device count analyzer 230 may thus further filter out those device counts from mobile device location data providers 125 which have a total sum over the lookback range for all similar AOIs for a target AOI which are below a certain threshold (e.g., 100 devices). By filtering based on the lookback range, a number of reported devices can be compared during a period of time that is similar to the target time for the target AOI. This temporal recency may be important in generating a more accurate population estimate.

The device/object count aggregator 240 receives the AOI device count 235 and the AOI object count 225 in order to generate an estimate of a population count for the target AOI 205 for a target time.

For a given target AOI 205, at a given target time, the device/object count aggregator 240 receives the AOI object counts 225 and AOI device counts 235 for similar AOIs to the target AOI. Each object count 225 is associated with a specific capture event for the similar AOI. Each device count 235 is associated with the capture event, and furthermore, is associated with a mobile device location data provider 125. Thus, each capture event for a similar AOI has an object count 225, and one or more device counts 235 (one for each provider). The device/object count aggregator 240 may receive the object counts 225 and device counts 235 for a similar AOI for a single capture event, or for multiple capture events for that similar AOI. For example, the device/object count aggregator 240 may receive information related to capture events of similar AOIs with timestamps within the lookback range of the target time.

For each capture event of a similar AOI, the device/object count aggregator 240 computes a ratio values between the object count 225 for that capture event and one of the device counts 235. For example, if an object count is 10, and a device count is 4, then the ratio is 2.5. This results in the device/object count aggregator 240 computing multiple ratio values. Each similar AOI may have multiple ratio values for each capture event, and each similar AOI may have multiple capture events for which the device/object count aggregator 240 computes the ratio values.

The device/object count aggregator 240 may compute these ratio values prior to receiving a request for the population estimate for the target AOI 205.

After computing these multiple ratio values, the device/object count aggregator 240 also retrieves a device count for the target AOI that was generated by the AOI location device count analyzer 230 from location data with a timestamp that is closest to the target time. Multiple device counts may be generated for the target AOI, each from data from a separate mobile device location data provider 125.

The device/object count aggregator 240 modifies each of the device counts from the target AOI with the ratios from the similar AOIs using a modification function. The device counts from one mobile device location data provider 125 are combined with ratios generated from data from the same mobile device location data provider 125. In one embodiment, the modification function is a product between the device count and each ratio value. In other embodiments, the modification function can be any other mathematical operator or combination of mathematical operators, such as a using Bayesian priors to perform a weighted division between the device count and the ratio values. This generates multiple estimates of the population. A similar process is performed for the remaining data from the different mobile device location data providers 125, resulting in additional estimates.

The device/object count aggregator 240 further combines these estimates into a single combined estimate using a combining function. In one embodiment, the combining function determines the single combined estimate by selecting the median value from the multiple estimate values. In another embodiment, the combining function is a weighted average of the various estimate values. The weighting may depend on multiple factors. Estimates that are generated from similar AOIs that have characteristics that are closer in value or have more matches to the target AOI may be weighted higher. Estimates that are generated from mobile device location data providers 125 which have higher total userbase counts or reputation for accuracy may be weighted higher. Estimates that are generated from data with timestamps nearer to the target time may be weighted higher.

Once the device/object count aggregator 240 generates the combined estimate 245, it may be stored, such as within the AOI image store 140 in association with the target AOI and associated with the target time. A new combined estimate 245 may be generated periodically (e.g., daily) or as new mobile device usage data or new image data is received. The combined estimate 245 may also be transmitted by the device/object count aggregator 240 to a requestor (i.e., the entity which requested the estimate for the target AOI), along with other metadata regarding the estimate, such as the target AOI, the similar AOIs used to generate the estimate, the lookback range, the target time, and so on. In one embodiment, the device/object count aggregator 240 presents to the requestor a graphical user interface via a client device allowing the requestor to select the similar AOIs which are used to generate the combined estimate, to select a particular combining function to be used, to select a particular modification function to be used, and to modify other factors used to generate the estimate, such as the lookback range, etc. This advantageously allows the requestor to further modify the computation of the estimate based on the requirements of the requestor. The requestor may also input into the graphical interface an estimate that the requestor has received externally. This external estimate may be used to further modify (e.g., increase or decrease) future estimates from the device/object count aggregator 240.

The device/object count aggregator 240 may also transmit the combined estimate and any other data as a computer-readable data structure and/or store it locally in a database, such as the AOI image store 140 and associated with the respective AOI. The computer-readable data structure may be a pandas dataframe (i.e., a two-dimensional size-mutable, potentially heterogeneous tabular data structure with labeled axes).

In one embodiment, the device/object count aggregator 240 further converts the combined estimate to a secondary estimate based on a conversion rate. For example, if the object count is a count of a number of vehicles, then the combined estimate is an estimate of the vehicle count at the target AOI. However, a requestor may also wish to know an estimate of a number of people at the target AOI. In this case, the device/object count aggregator 240 may retrieve a conversion rate indicating a number of people per vehicle, and convert the combined estimate to the secondary estimate based on the conversion rate. This secondary estimate is also provided to the requestor, similar to the method in which the combined estimate is provided.

Example Population Estimation

Figure 3A:
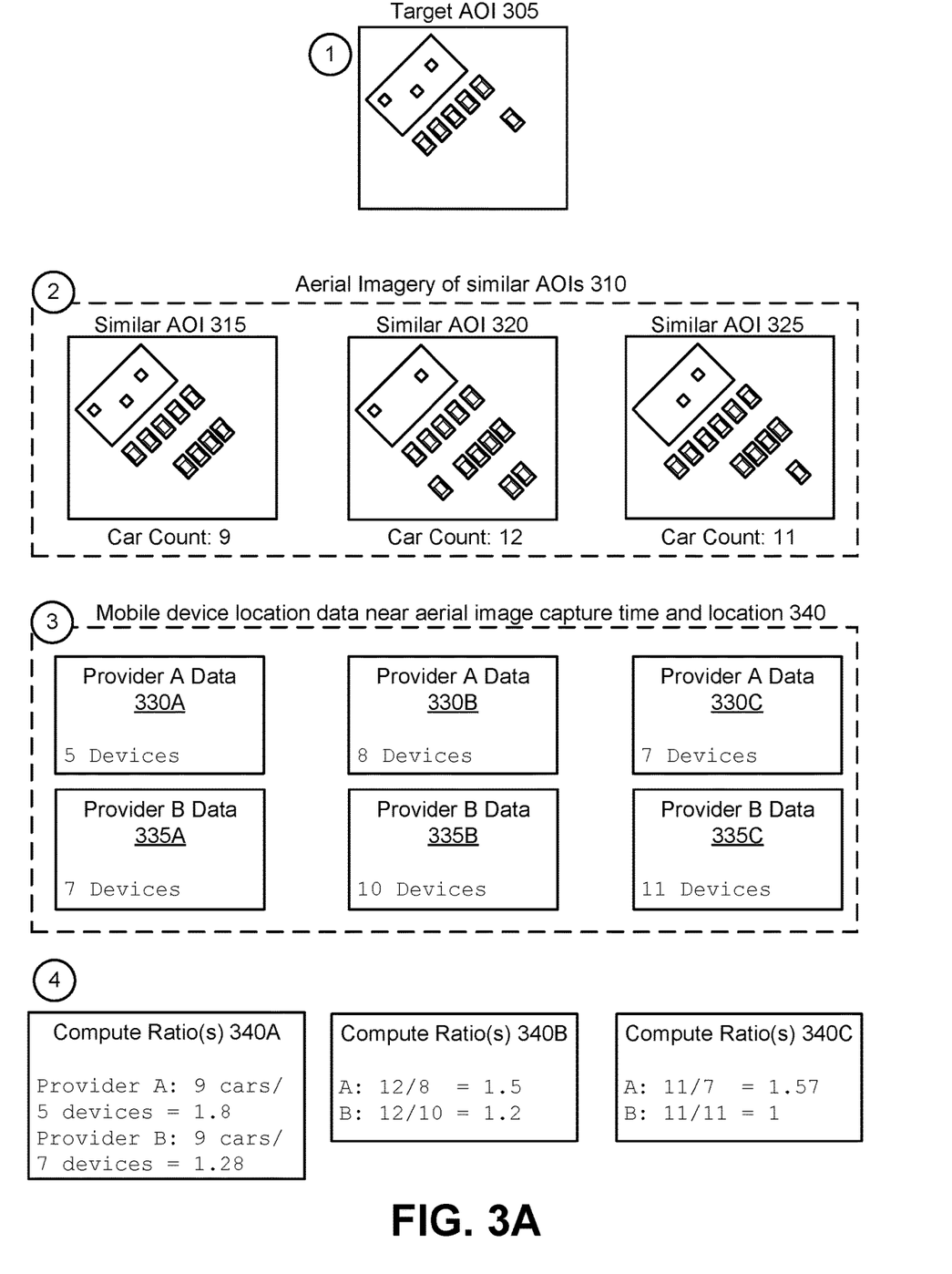
FIG. 3A illustrates an example of the estimation of an object population at a target AOI using sensor data and distributed device data, in accordance with an embodiment.

FIG. 3A illustrates an example of the estimation of an object population at a target AOI using sensor data and distributed device data, in accordance with an embodiment. FIG. 3A thus illustrates an example of the process described above with relation to FIGS. 1-2. At (1) in FIG. 3A, a target AOI 305 is selected and a population estimation is requested for the target AOI 305. This request may be received either before or after the process described below of generating the ratio values is performed. At (2), aerial imagery 310 of similar AOIs are identified. These may be aerial imagery of the similar AOIs which have been captured within a lookback range (e.g., 7 days). In the provided example, three similar AOIs 315, 320, and 325 are identified, each with one captured image. This process may be performed by the similar AOI identifier 210.

The object count, in this case, the car count, is determined for each of the similar AOIs 315, 320, and 325. This may be performed using the object count image analyzer 220. In the illustrated example, similar AOI 315 has a car count of 9, similar AOI 320 has a car count of 12, and similar AOI 325 has a car count of 11.

At (3), the associated mobile device location data 340 for the similar AOIs (near the time of capture of the images) is retrieved. Here, two mobile device location data providers are shown, provider A and provider B. Each provides a count of devices for each similar AOI, as shown in the Provider A Data 330A-C and Provider B Data 335A-C. The device count information may be generated by the AOI location device count analyzer 230.

At (4), the ratios for each similar AOI are computed as indicated at blocks 340A-C. These are computed by dividing the car count for the similar AOI by the device count for each provider. Thus, for example, for the similar AOI 315, the ratio value for provider A is 9 cars/5 devices, as provider A reported 5 devices for the similar AOI 315. This process may also be performed by the device/object count aggregator 240. As noted, the above process may be pre-computed for different target AOIs before requests are received for the target AOI. The process continues in FIG. 3B, which illustrates a continuation of the example in FIG. 3A for the estimation of an object population at a target AOI using sensor data and distributed device data, in accordance with an embodiment.

Figure 3B:
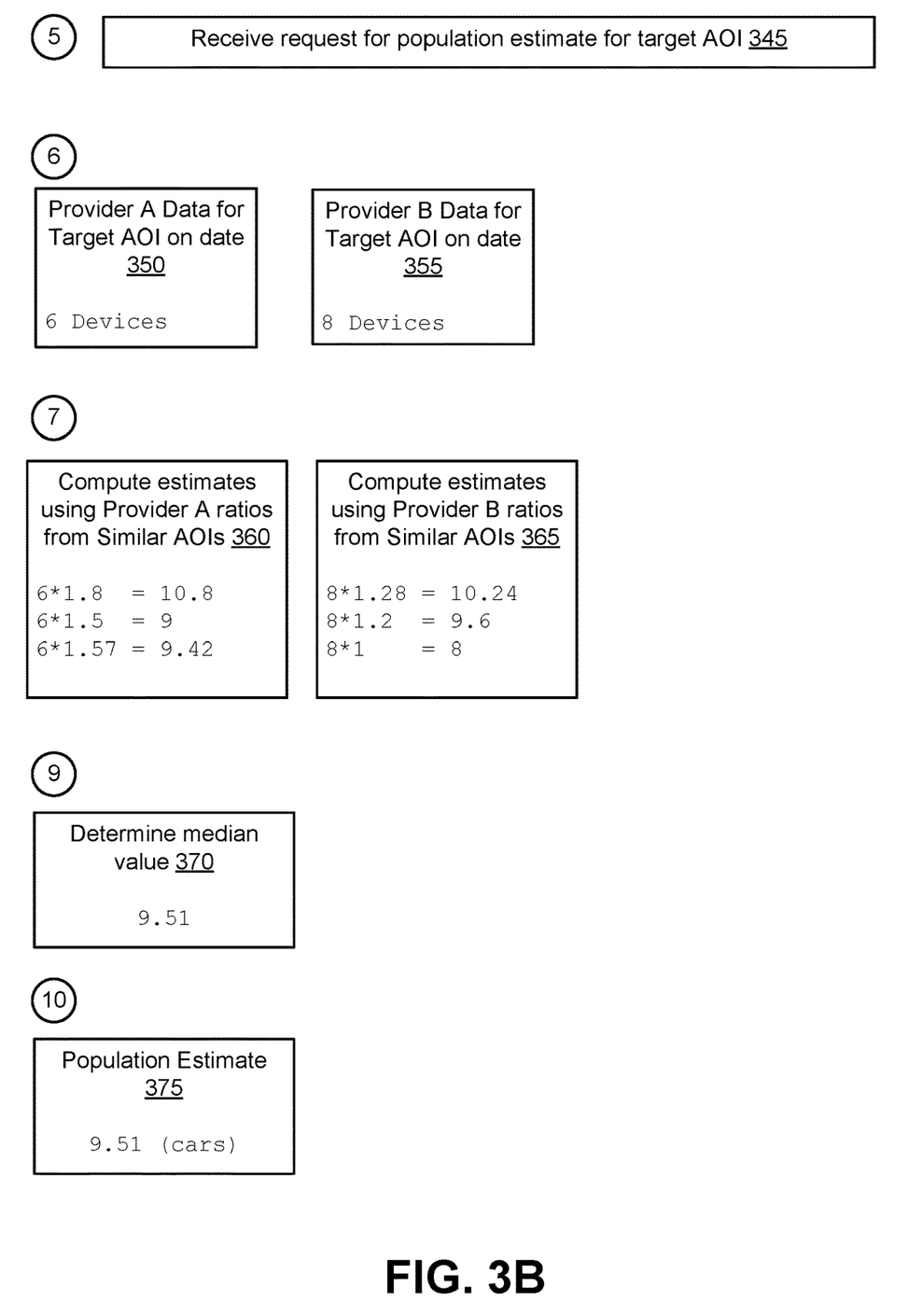
FIG. 3B illustrates a continuation of the example in FIG. 3A for the estimation of an object population at a target AOI using sensor data and distributed device data, in accordance with an embodiment.

At (4) in FIG. 3B, a request may be received 345 for a population estimate for the target AOI. At (6), location data is retrieved from the providers or from a database for the target AOI. In the illustrated example, the data 350 from provider A shows 6 devices, while the data 355 from provider B shows 8 devices. At (7), estimates are computed using the ratios values computed for each provider and similar AOI. Thus, at 360, estimates are computed using the data 350 for the target AOI from provider A, which is multiplied by the different ratio values computed at 340A-C for provider A. As there were 3 ratio values for the three similar AOIs, three estimates are generated at 360. A similar process is performed at 365 for the data from provider B, generating another three estimates. This process may also be performed by the device/object count aggregator 240.

At (9), the estimates are combined using the combining function at 370, which in this case selects the median value from all the estimates generated (both in 360 and 365). In the illustrated example, the median value is 9.51. At (10), the population estimate 375, which in this case is the median value, is reported as 9.51 cars. The processes at (9) and (10) may also be performed by the device/object count aggregator 240.

Note that the numbers/counts described in this example are intentionally kept relatively small compared to an actual scenario to facilitate ease of understanding. In actual practice, the number of cars, number of providers (and thus applications), and number of devices at a location will likely be greater than the range described here.

Example Process for Identifying Remote Objects

Figure 4:
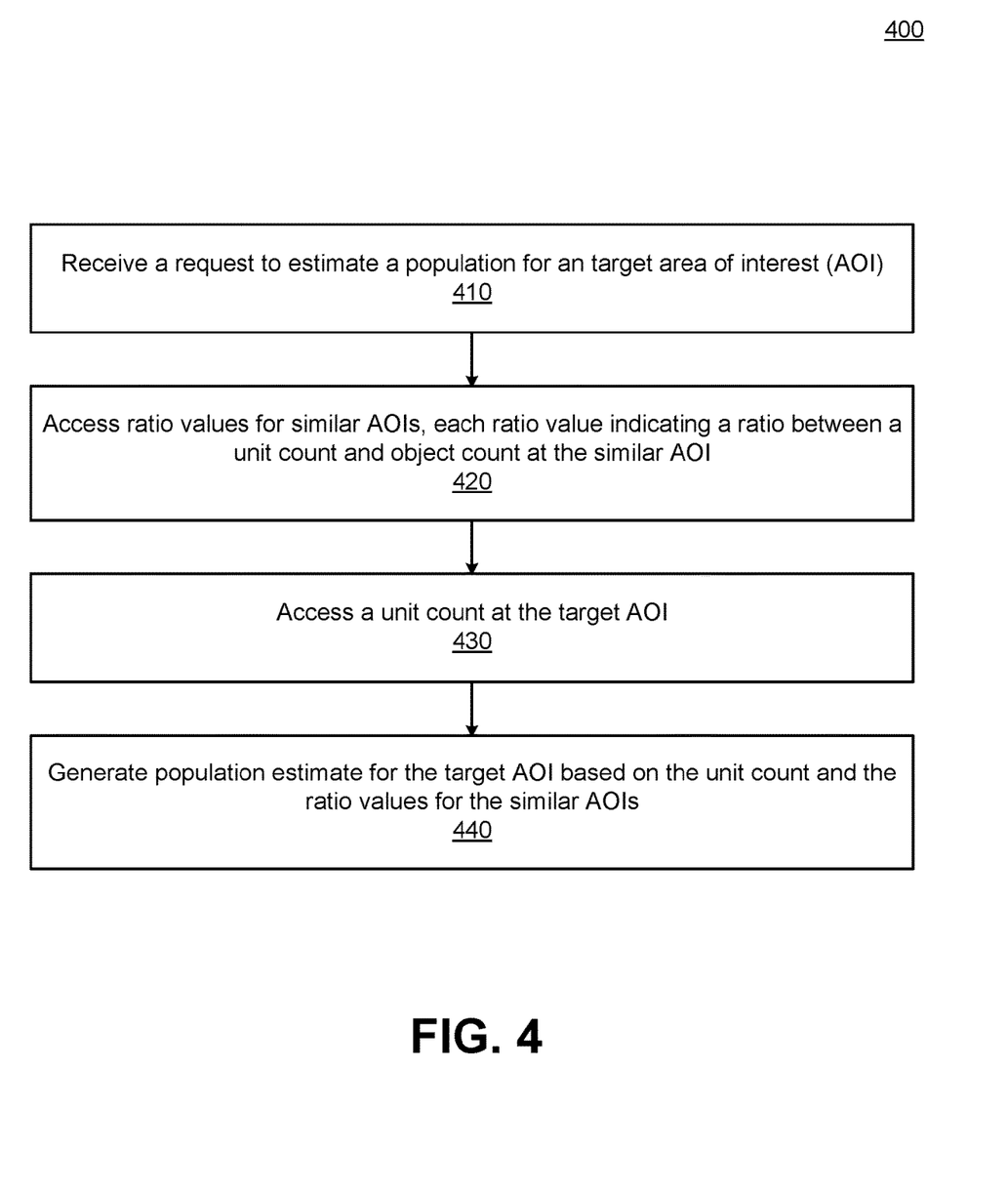
FIG. 4 is a flow diagram illustrating an exemplary process for joint modeling of object population estimation using sensor data and distributed device data, in accordance with an embodiment.

FIG. 4 is a flow diagram illustrating an exemplary process for joint modeling of object population estimation using sensor data and distributed device data, in accordance with an embodiment. In some example embodiments, the process may have different and/or additional steps than those described in conjunction with FIG. 4. Steps of the process may be performed in different orders than the order described in conjunction with FIG. 4. Some steps may be executed in parallel. Alternatively, some of the steps may be executed in parallel and some steps executed sequentially. Alternatively, some steps may execute in a pipelined fashion such that execution of a step is started before the execution of a previous step. In one embodiment, the process is performed by the population estimation system 135.

The population estimation system 135 receives 410 a request to estimate a population for a target area of interest (AOI). This is the target AOI. To generate this estimate, the population estimation system 135 accesses 420 ratio values for similar AOIs to the target AOI, which as noted above share measurable characteristics to the target AOI. These measurable characteristics may be within a range of the same or similar characteristics of the target AOI. The ratio values, as noted above, are a ratio between an object count reported at the similar AOI and a device or unit count reported at the similar AOI, and may be generated based on data gathered within a lookback range. The population estimation system 135 further accesses 430 a unit count, which may be a device count, for the target AOI. This unit count may be based on data nearest to a target time. The population estimation system 135 generates 440 a population estimate for the target AOI based on this unit count and the ratio values of the similar AOIs. This may be generated by, for example, multiplying the unit count by the various ratio values to generate multiple estimates and taking the median of the estimates.

Example Machine Architecture

Figure 5:
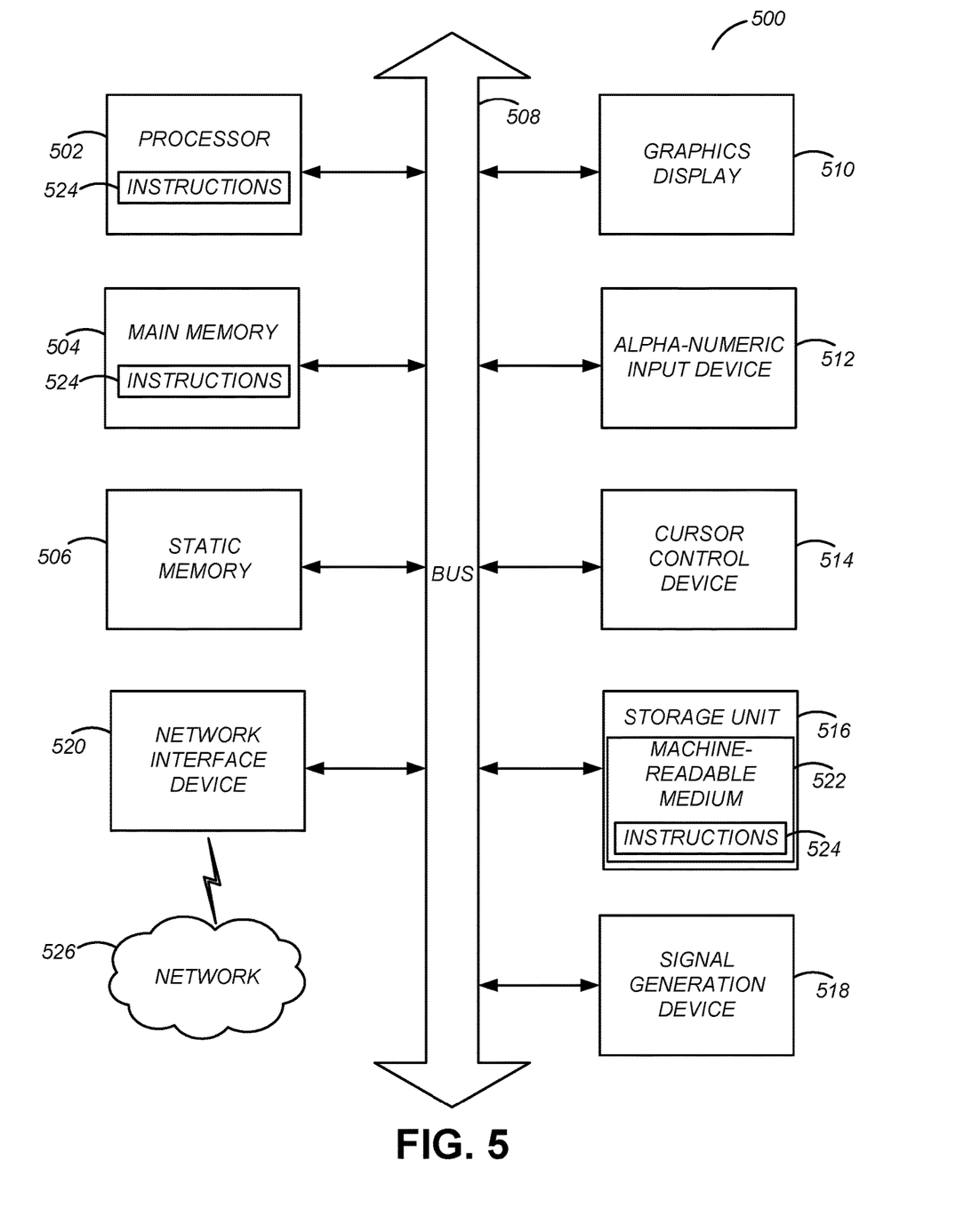
FIG. 5 is a block diagram illustrating components of an example machine able to read instructions from a machine-readable medium and execute them in a processor or controller.

FIG. 5 is a block diagram illustrating components of an example machine able to read instructions described as processes herein from a machine-readable medium and execute them in at least one processor (or controller). Specifically, FIG. 5 shows a diagrammatic representation of a machine in the example form of a computer system 500. The computer system 500 can be used to execute instructions 524 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment. It is noted the instructions correspond to the functionality of components and/or processes described herein, for example, with respect to FIGS. 1-4.

The machine may be a server computer, a client computer, a personal computer (PC), a tablet PC, a set-top box (STB), a smartphone, an internet of things (IoT) appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes one or more processing units (generally processor 502). The processor 502 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 500 also includes a main memory 504. The computer system may include a storage unit 516. The processor 502, memory 504 and the storage unit 516 communicate via a bus 508.

In addition, the computer system 500 can include a static memory 506, a display driver 510 (e.g., to drive a plasma display panel (PDP), a liquid crystal display (LCD), or a projector). The computer system 500 may also include alphanumeric input device 512 (e.g., a keyboard), a cursor control device 514 (e.g., a mouse, a trackball, a joystick, a motion sensor, or other pointing instrument), a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. The instructions 524 may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store the instructions 524. The term "machine-readable medium" shall also be taken to include any medium that is capable of storing instructions 524 for execution by the machine and that cause the machine to perform any one or more of the methodologies disclosed herein. The term "machine-readable medium" includes, but not be limited to, data repositories in the form of solid-state memories, optical media, and magnetic media. It is noted that in some example embodiments, the core components of the computer system may disregard components except for the processor 502, memory 504, and bus 508 and may in other embodiments also include the storage unit 516 and/or the network interface device 520.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated and described with FIGS. 1-4. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 502, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, include processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that includes a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the claimed invention. This description should be read to include one or at least one and the singular also includes the plural unless it is obvious that it is meant otherwise.

Upon reading this disclosure, those of skill in the art will appreciate still additional alternative structural and functional designs for a system to estimate a population estimate of an AOI. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A system comprising:
 a storage subsystem to store sensor data collected for areas of interest (AOI);
 an object count sensor data analyzer configured to determine a count of unique objects located in an AOI based on sensor data received from the storage system for the AOI;
 a population estimation system configured to:
  receive a request to estimate a population for a target AOI;
  access a number of reported units at the target AOI, wherein the number of reported units is determined based on reported device usage data for the target AOI;
  for a plurality of similar AOIs, access a count of unique objects located at each similar AOI from the object count sensor data analyzer, the similar AOI having measurable characteristics that are within a range of similarity with corresponding measurable characteristics of the target AOI; and
  generate an estimate of a population at the target AOI based on the number of reported units at the target AOI and the count of unique objects located at each similar AOI.

2. The system of claim 1, wherein:
 the number of reported units at the target AOI is temporally dense data; and
 the count of unique objects located at each similar AOI temporally sparse data.

3. The system of claim 1, wherein:
 the number of reported units at the target AOI is determined at a first frequency; and
 the count of unique objects located at each similar AOI is determined at a second frequency that is less than the first frequency.

4. The system of claim 1, wherein the population estimate system is further configured to:
 convert the number of reported units at the target AOI into an estimate of a number of people at the target AOI using a conversion value.

5. The system of claim 1, wherein each similar AOI of the plurality of similar AOIs is determined based on a sharing of measurable characteristics between the similar AOI and the target AOI, the characteristics comprising at least one of a population finding condition type available at an AOI, proximity of the AOI to areas producing false unit reports, geographic size of the AOI, attendance rate of users at the AOI, location of the AOI, types of public transportation options available at the AOI, revenue generated by AOI, region type at the AOI, availability of covered parking at the AOI, and demographics of users at the AOI.

6. The system of claim 1, wherein each similar AOI of the plurality of similar AOIs is selected for 1) having a size that is within a threshold range of the target AOI, 2) having a location that is at least a threshold distance from a pathway having average object activity beyond a threshold rate, and 3) having finding condition areas comprising no more than a threshold percentage of a total object detection available at the similar AOI.

7. The system of claim 1, wherein the number of reported units at the target AOI is extracted from data received from a third party that indicates a geographical location of one or more units at one or more points in time.

8. The system of claim 1, wherein the population estimation system is further configured to:
search a database of stored sensor data of each similar AOI for candidate sensor data of the similar AOI having time metadata within a threshold range of time of a request time; and
determine the count of unique objects located at each similar AOI by selecting a candidate sensor data of the similar AOI with an acquisition time that is closest to the request time.

9. A non-transitory computer readable storage medium, storing computer-readable instructions, that when executed by one or more processors of a computing system, causes the one or more processors to:
receive a request to estimate a population for a target AOI;
access a number of reported units at the target AOI, wherein the number of reported units is determined based on reported device usage data for the target AOI;
for a plurality of similar AOIs, access a count of unique objects located at each similar AOI, wherein the number of unique objects is determined based on sensor data collected for the similar AOI and the similar AOI has characteristics that are within a range of similarity with corresponding measurable characteristics of the target AOI; and
generate an estimate of a population at the target AOI based on the number of reported units at the target AOI and the count of unique objects located at each similar AOI.

10. The non-transitory computer readable storage medium of claim 9, wherein:
the number of reported units at the target AOI is temporally dense data; and
the count of unique objects located at each similar AOI temporally sparse data.

11. The non-transitory computer readable storage medium of claim 9, wherein the instructions for generating the number estimate of the population at the target AOI further cause the one or more processors to:
convert the number of reported units at the target AOI into an estimate of a number of people at the target AOI using a conversion value.

12. The non-transitory computer readable storage medium of claim 9, wherein each similar AOI of the plurality of similar AOIs is determined based on a sharing of measurable characteristics between the similar AOI and the target AOI, the characteristics comprising at least one of a population finding condition type available at an AOI, proximity of the AOI to areas producing false unit reports, geographic size of the AOI, attendance rate of users at the AOI, location of the AOI, types of public transportation options available at the AOI, revenue generated by AOI, region type at the AOI, availability of covered parking at the AOI, and demographics of users at the AOI.

13. The non-transitory computer readable storage medium of claim 9, wherein each similar AOI of the plurality of similar AOIs is selected for 1) having a size that is within a threshold range of the target AOI, 2) having a location that is at least a threshold distance from a pathway having average object activity beyond a threshold rate, and 3) having finding condition areas comprising no more than a threshold percentage of a total object detection available at the similar AOI.

14. The non-transitory computer readable storage medium of claim 9, wherein the number of reported units at the target AOI is extracted from data received from a third party that indicates a geographical location of one or more units at one or more points in time.

15. The non-transitory computer readable storage medium of claim 9, wherein the instructions for determining the number of unique objects is based on sensor data collected for the similar AOI further cause the one or more processors to:
search a database of stored sensor data of each similar AOI for candidate sensor data of the similar AOI having time metadata within a threshold range of time of a request time; and
determine the count of unique objects located at each similar AOI by selecting a candidate sensor data of the similar AOI with an acquisition time that is closest to the request time.

16. A method comprising:
receiving a request to estimate a population for a target AOI;
accessing a number of reported at the target AOI, wherein the number of reported units is determined based on reported device usage data for the target AOI;
for a plurality of similar AOIs, accessing a count of unique objects located at each similar AOI, wherein the count of unique objects is determined based on sensor data collected for the similar AOI and the similar AOI has characteristics that are within a range of similarity with corresponding measurable characteristics of the target AOI; and
generating an estimate of a population at the target AOI based on the number of reported units at the target AOI and the count of unique objects located at each similar AOI.

17. The method of claim 16, wherein generating the number estimate of the population at the target AOI comprises:
converting the number of reported units at the target AOI into an estimate of a number of people at the target AOI using a conversion value.

18. The method of claim 16, wherein each similar AOI of the plurality of similar AOIs is determined based on a sharing of measurable characteristics between the similar AOI and the target AOI, the characteristics comprising at least one of a population finding condition type available at an AOI, proximity of the AOI to areas producing false unit reports, geographic size of the AOI, attendance rate of users at the AOI, location of the AOI, types of public transportation options available at the AOI, revenue generated by AOI, region type at the AOI, availability of covered parking at the AOI, and demographics of users at the AOI.

19. The method of claim 16, wherein each similar AOI of the plurality of similar AOIs is selected for 1) having a size that is within a threshold range of the target AOI, 2) having a location that is at least a threshold distance from a pathway having average object activity beyond a threshold rate, and 3) having finding condition areas comprising no more than a threshold percentage of a total object detection available at the similar AOI.

20. The method of claim 16, wherein determining the number of unique objects is based on sensor data collected for the similar AOI comprises:

searching a database of stored sensor data of each similar AOI for candidate sensor data of the similar AOI having time metadata within a threshold range of time of a request time; and determining the count of unique objects located at each similar AOI by selecting a candidate sensor data of the similar AOI with an acquisition time that is closest to the request time.

\* \* \* \* \*